(12) United States Patent
Perry et al.

(10) Patent No.: US 7,971,853 B2
(45) Date of Patent: Jul. 5, 2011

(54) FRICTION SPRING FOR LEAK DETECTION POPPET

(75) Inventors: Paul Douglas Perry, Chatham (CA); Derek Thomas Landschoot, Tilbury (CA)

(73) Assignee: Continental Automotive Systems US, Inc., Auburn Hills ( * ) Notice: Subject to any disclaimer, the term of this patent is extended or adjusted under 35 U.S.C. 154(b) by 848 days.

(21) Appl. No.: 12/007,306

(22) Filed: Jan. 9, 2008

(65) Prior Publication Data

US 2008/0173269 A1 Jul. 24, 2008

Related U.S. Application Data

(60) Provisional application No. 60/885,466, filed on Jan. 18, 2007.

(51) Int. Cl.
*F16L 3/10* (2006.01)
(52) U.S. Cl. .................. 251/176; 251/193; 251/337
(58) Field of Classification Search .............. 251/176, 251/193, 337
See application file for complete search history.

(56) References Cited

U.S. PATENT DOCUMENTS

| 277,328 | A | * | 5/1883 | Murphy | 251/176 |
| 2,285,655 | A | * | 6/1942 | Heinemann | 251/113 |
| 3,263,699 | A | * | 8/1966 | Givler et al. | 137/480 |
| 3,345,986 | A | * | 10/1967 | Roberts et al. | 604/249 |
| 3,773,082 | A | * | 11/1973 | Davis | 137/625.48 |
| 4,138,089 | A | * | 2/1979 | McCarthy | 251/61 |
| 5,010,783 | A | * | 4/1991 | Sparks et al. | 74/527 |
| 5,070,908 | A | * | 12/1991 | Hahn | 137/625.25 |
| 6,578,818 | B1 | * | 6/2003 | Krimmer et al. | 251/129.2 |
| 6,776,391 | B1 | * | 8/2004 | Goossens et al. | 251/129.15 |
| 6,957,659 | B1 | * | 10/2005 | Sheppard | 137/243 |
| 7,481,414 | B2 | * | 1/2009 | Perry | 251/48 |
| 2006/0042688 | A1 | * | 3/2006 | Sebor | 137/114 |

* cited by examiner

*Primary Examiner* — John Bastianelli

(57) ABSTRACT

A pressure management apparatus including a housing (30) defining a fluid communication passage between first and second fluid ports (46, 48). A poppet (40) is disposed in the housing and is movable between first and second positions. The first position prevents fluid communication between the first and second fluid ports, and the second position permits fluid communication between the first and second fluid ports. The poppet includes a portion (75) translatable along an axis relative to the housing. A member (78) is fixed with respect to the housing and is associated with the portion of the poppet. Spring structure (72) is associated with the portion of the poppet. The spring structure is constructed and arranged to engage and bias the portion of the poppet to frictionally engage a portion of the member to create a dashpot damping of resonance of the poppet in the second position.

14 Claims, 5 Drawing Sheets

FRICTION SPRING FOR LEAK DETECTION POPPET

This application claims the benefit of the earlier filing date of U.S. Provisional Application No. 60/885,466, filed on Jan. 18, 2007, and the content thereof is hereby incorporated by reference into this specification.

FIELD OF THE INVENTION

The invention relates to automotive leak detection on-board diagnostic and, more particularly, to a natural vacuum leak detector (NVLD) having a poppet with reduced resonance.

BACKGROUND OF THE INVENTION

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

An automotive leak detection on-board diagnostic (OBD) determines if there is a leak in the vapor management system of an automobile. The vapor management system can include the fuel tank headspace, the canister that collects volatile fuel vapors from the headspace, a purge valve and all associated hoses. A pressure/vacuum sensor or switch allows the engine computer to monitor the vacuum that is caused by the system cooling after the engine has been turned off and thereby performs the leak detection diagnostic. A vacuum relief function provides fail-safe operation of the purge flow system and guarantees that vacuum levels in the fuel tank do not endanger the integrity of the tank both with the engine on and off.

A pressure relief function is desired in order to "blow off" any excessive fuel vapor immediately after engine shutdown and to facilitate the desired vacuum generation. Another benefit of the pressure relief function is to allow air to exit the tank at high flow rates during tank refueling. This function is commonly known as Onboard Refueling Vapor Recovery (ORVR).

A conventional Natural Vacuum Leak Detector (NVLD) employs a solenoid coil to move the pressure relief valve into a fully open position in order to minimize purge flow restriction during engine on periods. During certain periods with the engine running, the solenoid is de-energized in order to allow a "Large Leak" test to run. During these periods, the NVLD armature and poppet can sometimes resonate and cause objectionable noise. Co-pending U.S. application Ser. No. 11/797,130, filed on May 1, 2007, discloses magnetic dampening for a poppet. This solution is effective, but a less costly solution is desired.

Thus, there is a need to provide an improved, cost-effective NVLD that eliminates poppet resonance.

SUMMARY OF THE INVENTION

An object of the invention is to fulfill the need referred to above. In accordance with the principles of the present invention, this objective is obtained by providing a pressure management apparatus including a housing defining a fluid communication passage between first and second fluid ports. A poppet is disposed in the housing and is movable between first and second positions. The first position prevents fluid communication between the first and second fluid ports, and the second position permits fluid communication between the first and second fluid ports. The poppet includes a portion translatable along an axis relative to the housing. A member is fixed with respect to the housing and is associated with the portion of the poppet. Spring structure is associated with the portion of the poppet. The spring structure is constructed and arranged to engage and bias the portion of the poppet to frictionally engage a portion of the member to create a dashpot damping of resonance of the poppet in the second position.

In accordance with another aspect of the disclosed embodiments, a poppet assembly for a pressure management apparatus for a vehicle includes a poppet defining an armature that is constructed and arranged to move between first and second positions. A stator member is associated with the poppet. Spring structure is associated with the poppet to engage and bias a portion of the poppet into frictional contact with the stator member to create a dashpot damping of resonance of the poppet.

In accordance with yet another aspect of the disclosed embodiment, a method of damping resonance of a poppet of a pressure management apparatus for a vehicle provides a poppet defining an armature that is constructed and arranged to move between first and second positions in a housing of the pressure management apparatus. A stator member is associated with the poppet and fixed with respect to the housing. The method includes biasing at least a portion of the poppet into frictional engagement with the stator member thereby damping resonance of the poppet as the poppet moves.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which.

DETAILED DESCRIPTION OF THE EXEMPLARY EMBODIMENTS

Figure 1:
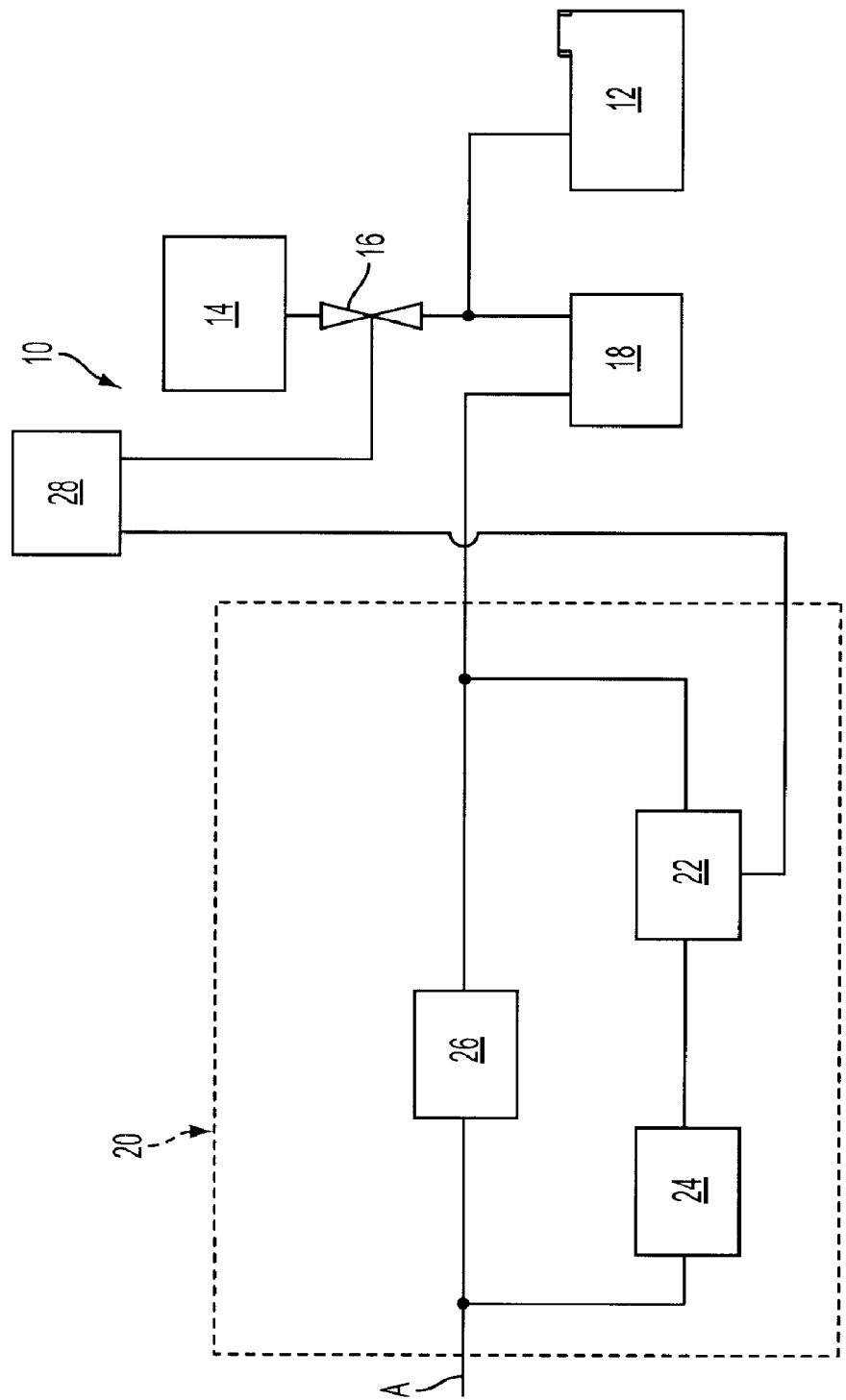
FIG. 1 is a schematic illustration showing a fuel system including a NVLD according to an embodiment of the present invention.

Referring to FIG. 1, a fuel system 10, e.g., for an engine (not shown), includes a fuel tank 12, a vacuum source 14 such as an intake manifold of the engine, a purge valve 16, a charcoal canister 18, and a pressure management apparatus, herein called a Natural Vacuum Leak Detector (NVLD) 20.

The NVLD 20 performs a plurality of functions including signaling 22 that a first predetermined pressure (vacuum) level exists in the headspace of the fuel system 10, relieving pressure 24 (also referred to as relieving excess vacuum) in the headspace of the fuel system 10 at a value below the first predetermined pressure level, and relieving pressure 26 (also referred to as pressure blow-off) in the headspace of the fuel system 10 above a second pressure level. Relieving pressure 24, 26 refers to the relieving pressure in the fuel vapor collection canister 18 and throughout the headspace of the fuel system 10 relative to the ambient atmospheric pressure A.

In the course of cooling that is experienced by the fuel system 10, e.g., after the engine is turned off, a vacuum is created in the fuel vapor collection canister 18. The existence of a vacuum at the first predetermined pressure level indicates that the integrity of the fuel system 10 is satisfactory. Thus, signaling 22 is used for indicating the integrity of the fuel system 10, i.e., that there are no appreciable leaks. Subsequently relieving pressure 24 at a pressure level below the first predetermined pressure level protects the integrity of the fuel tank 12, i.e., prevents it from collapsing due to vacuum in the fuel system 10.

Immediately after the engine is turned off, relieving pressure 26 allows excess pressure due to fuel vaporization to blow off, thereby facilitating the desired vacuum generation that occurs during cooling. During pressure blow-off, air within the fuel system 10 is released while fuel molecules are retained in the fuel vapor collection canister 18. Similarly, in the course of refueling the fuel tank 12, relieving pressure 26 allows air to exit the fuel tank 12 at high flow.

While the engine is turned on, controllably connecting 28 the fuel vapor collection canister 18 to the ambient air A allows confirmation of the purge flow and allows confirmation of the signaling 22 performance. While the engine is turned off, controllably connecting 28 allows a computer for the engine to monitor the vacuum generated during cooling.

Figure 2:
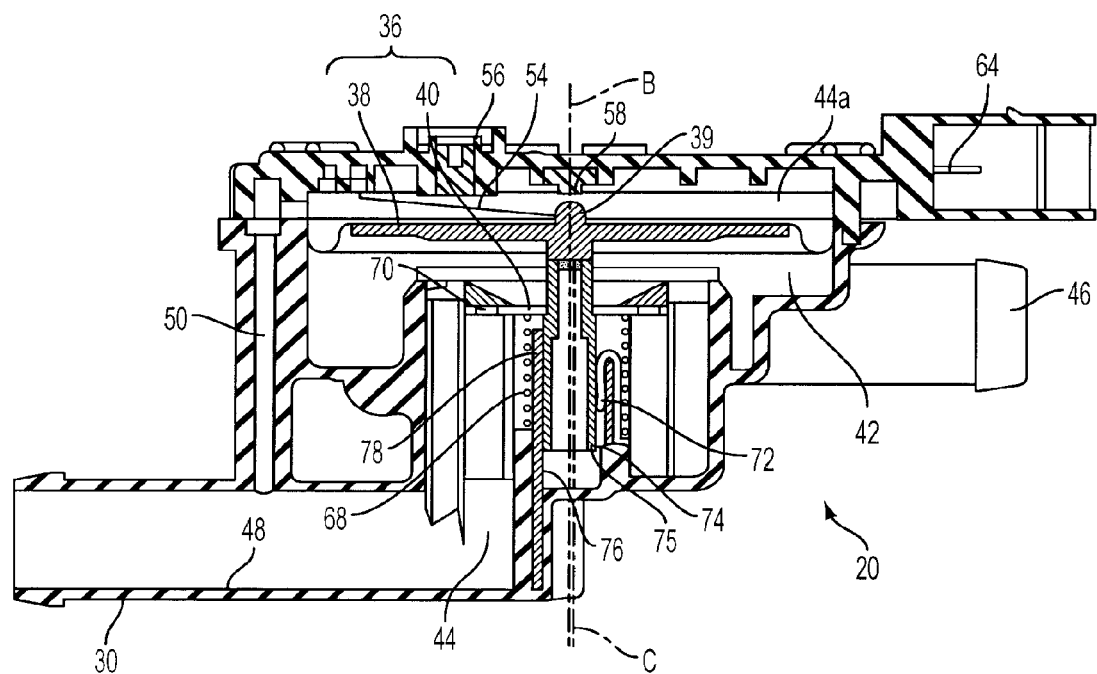
FIG. 2 is a sectional view of a NVLD having spring structure provided in accordance with an embodiment of the present invention.

FIG. 2 shows an embodiment of the NVLD 20 constructed and arranged to be associated with the charcoal canister 18. The NVLD 20 includes a housing 30 that can be connected to the body of the charcoal canister 18. The NVLD 20 provides a simplified configuration and eliminates poppet resonance by using a spring structure as will be described below.

Signaling 22 occurs when vacuum at the first predetermined pressure level is present in the charcoal canister 18. A pressure operable device 36 separates an interior chamber in the housing 30. The pressure operable device 36, which includes a diaphragm 38 that is operatively interconnected to a poppet or valve 40 so as to push the valve 40, separates the interior chamber of the housing 30 into a first portion 42 and a second portion 44. The first portion 42 is in fluid communication with the ambient atmospheric pressure through a first port 46. The second portion 44 is in fluid communication with a second port 48 between housing 30 and the charcoal canister 18. The second portion 44 is also in fluid communication with a separate portion 44a via signal passageway 50.

The force created as a result of vacuum in the separate portion 44a causes the diaphragm 38 to be displaced upwardly in FIG. 2. This displacement is opposed by a resilient element 54, e.g., a leaf spring. The bias of the resilient element 54 can be adjusted by a calibrating screw 56 such that a desired level of vacuum, e.g., one inch of water, will depress a switch 58 which is electrically connected to an outlet terminal 64. As vacuum is released, i.e., the pressure in the portions 44, 44a rises, the resilient element 54 pushes the diaphragm 38 away from the switch 58, whereby the switch 58 resets.

Pressure relieving 24 occurs as vacuum in the portions 44, 44a increases, i.e., the pressure decreases below the calibration level for actuating the switch 58. Vacuum in the charcoal canister 18 and the second portion 44 will continually act on the valve 40 inasmuch as the first portion 42 is always at or near the ambient atmospheric pressure A. At some value of vacuum below the first predetermined level, e.g., three inches of water, this vacuum will overcome the opposing force of a second resilient element 68 and displace the valve 40 away from a lip seal 70. This displacement will open the valve 40 from its closed position, thus allowing ambient air to be drawn through the first portion 42 into the second portion 44. That is to say, in an open position of the valve 40, the first and second ports 46, 48 are in fluid communication. In this way, vacuum in the fuel system 10 can be regulated.

Figure 3:
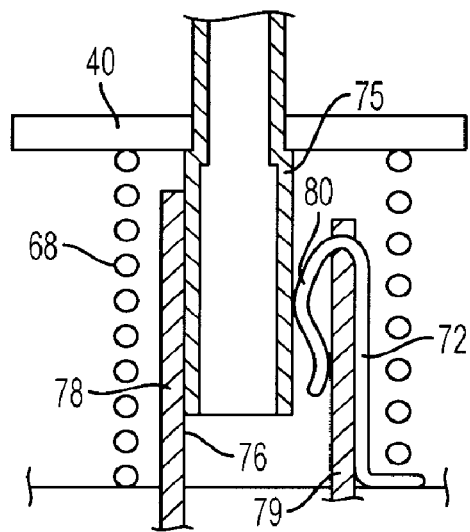
FIG. 3 is an enlarged view of a poppet, restraining tube and spring structure of FIG. 2.

According to a preferred embodiment of the present invention, the valve 40 is formed of injection molded plastic and is normally biased toward lip seal 70 due to the force of the second resilient element 68. With reference to FIGS. 2 and 3, to minimize resonance of the valve 40, particularly during pressure relieving 24, a damping movement effect is provided. The valve 40, defining an armature, has spring structure 72 associated therewith to push a translatable portion or tubular portion 75 of the poppet 40 against a surface 76 of a restraining tube 78. As best shown in FIG. 3, the spring structure 72 can be associated with a wall 79 of the restraining tube 78. It can be appreciated that if the restraining tube 78 is a partial tube and thus arc shaped, the wall 79 can be part of the housing 30. In the embodiment of FIG. 3, the bent metal wire spring structure 72 is secured at one portion by a clip or other means to the wall 79 with a fee end 80 of the spring structure 72 engaging the tubular portion of the poppet 40.

The dashpot effect (damping) is created via friction between an outer surface 74 of a tubular portion 75 of the valve 40 and an inner surface 76 of a member preferably in the form of the restraining tube 78 that is fixed to the housing 30. Thus, the spring structure 72 pushes on one portion of the outer surface 74 of the tubular portion 75 with another portion of the outer surface 74 engaging the inner surface 76 of the restraining tube 78. As noted above, the restraining tube 78 can be a partial tube that is of an arc-shape having an arc length less than 180 degrees.

The ferrous portion of the restraining tube 78 defines a stator. It is noted that the armature (valve 40) is biased towards the stator and is therefore it is pulled off-center within the restraining tube 78. To compensate for this effect, the axis C of the restraining tube 78 and thus the stator is located off-center (from vertical axis B) an equal distance in the opposite direction. The friction force dampens the motion of the valve 40 which has the effect of stopping resonance during the pressure relieving 24, 26.

Relieving pressure 26 is provided when there is a positive pressure in the second portion 44, e.g., when the tank 12 is being refueled. Specifically, the valve 40 is displaced to its open position to provide a very low restriction path for escaping air from the tank 12. When the charcoal canister 18, and hence the second portion 44, experience positive pressure above ambient atmospheric pressure, the signal passageway 50 communicates this positive pressure to the separate portion 44a. In turn, this positive pressure displaces the diaphragm 38 downward toward the valve 40. A diaphragm pin 39 transfers the displacement of the diaphragm 38 to the valve 40, thereby displacing the valve 40 to its open position with respect to the lip seal 70. Thus, pressure in the charcoal canister 18 due to refueling is allowed to escape through the lower portion 44, past the lip seal 70, through the first portion 42, and through the second port 46.

Relieving pressure 26 is also useful for regulating the pressure in fuel tank 12 during any situation in which the engine is turned off. By limiting the amount of positive pressure in the fuel tank 12, the cool-down vacuum effect will take place sooner.

Figure 4:
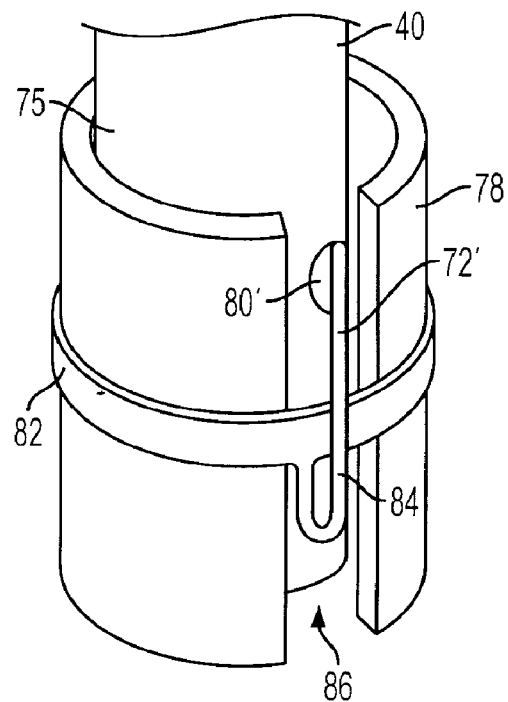
FIG. 4 is a view of spring structure of another embodiment of the invention shown secured to a restraining tube and biasing a poppet.
Figure 5:
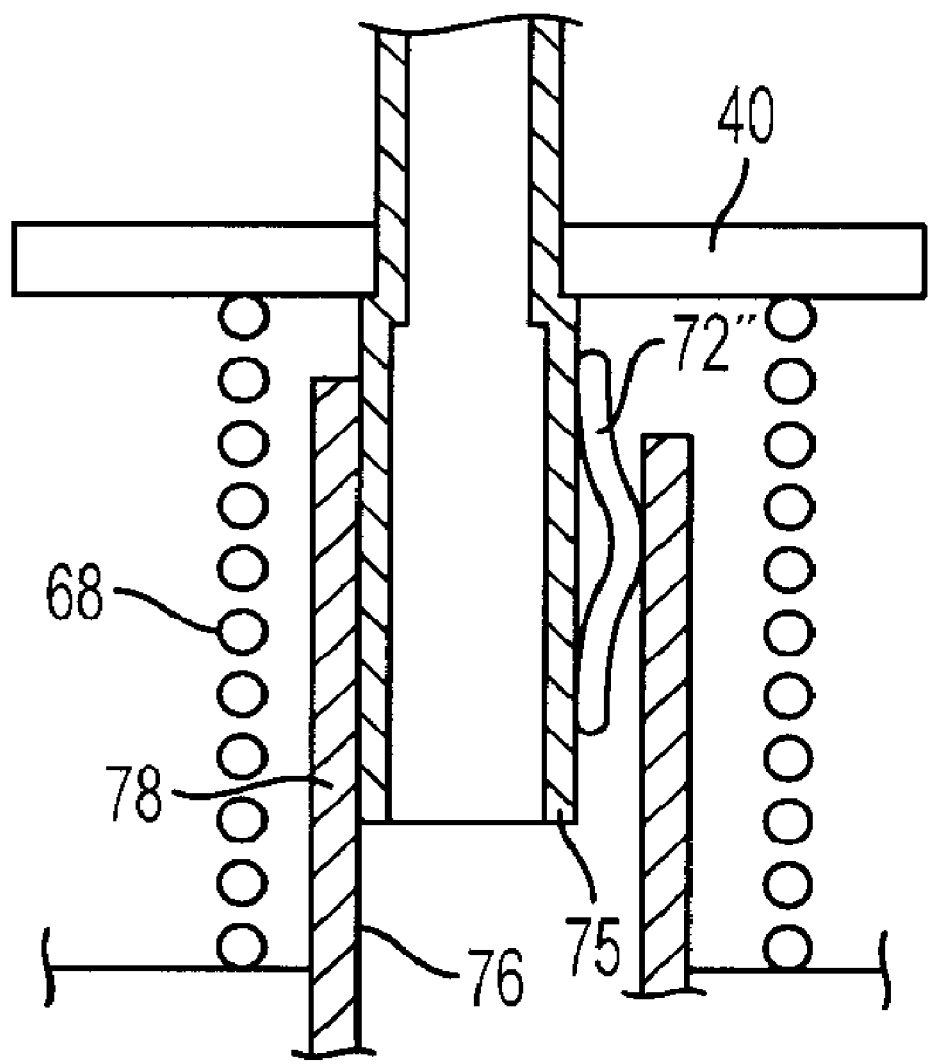
FIG. 5 is a view of spring structure of another embodiment of the invention shown secured to a poppet and biasing the poppet.

It can be appreciated that the spring structure 72 can be of any configuration that engages and biases the poppet 40 towards a fixed member. The spring structure can be secured to any stationary structure of the device such as the restraining tube 78 or housing 30. For example, as shown in FIG. 4, the spring structure 72' may be of the type that includes a resilient, generally C-shaped base 82 that clips on and frictionally engages the a portion of the periphery of the restraining tube 78. A spring member 84 is coupled with the base 82. The restraining tube 78 has an opening 86, with a free end 80' of the spring member 84 being disposed in the opening so as to contact the portion 75 of the poppet 40. Still further, as shown in FIG. 5, the poppet 40 itself may include the spring structure 72" which biases the poppet into engagement with the restraining tube 78.

Figure 6:
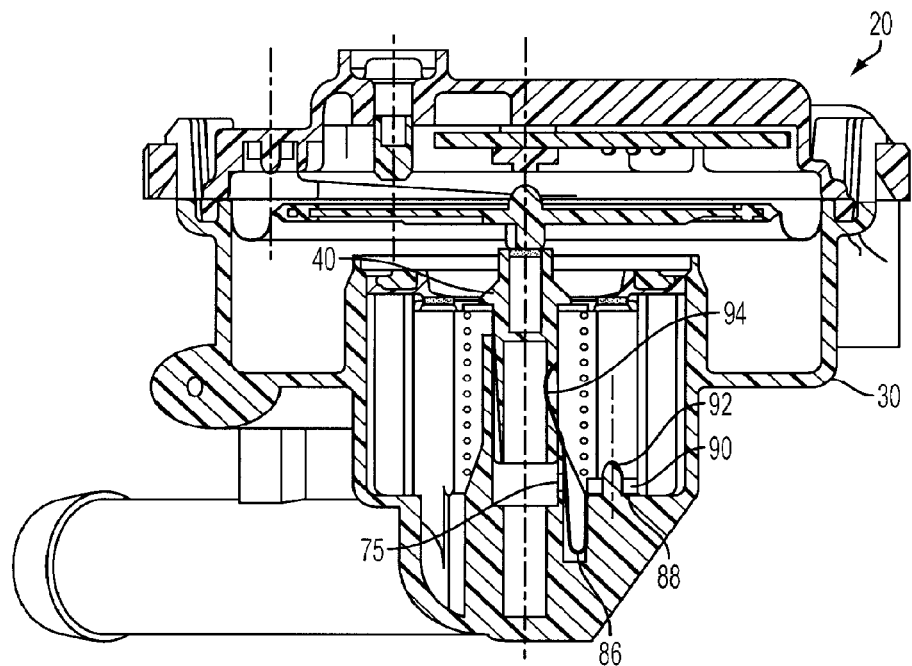
FIG. 6 is a sectional view of a NVLD having spring structure provided in accordance with another embodiment of the present invention.
Figure 7:
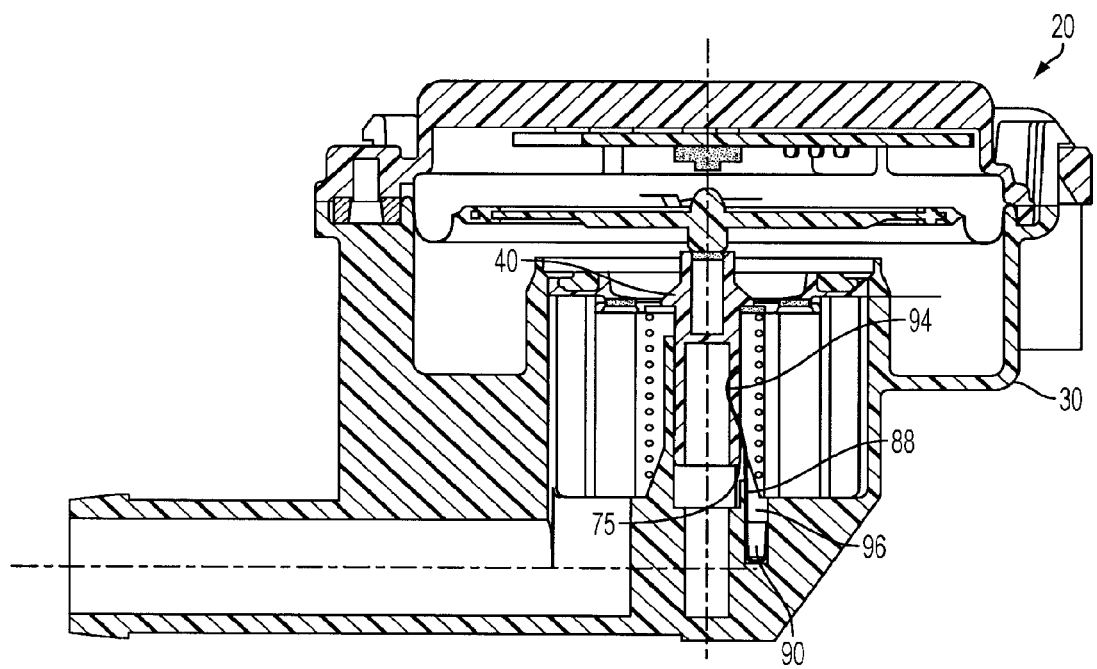
FIG. 7 is a sectional view of a NVLD having spring structure provided in accordance with yet another embodiment of the present invention.

FIGS. 6 and 7 show a NVLD 20 having even further embodiments of spring structure. Thus, In FIG. 6, the spring structure 86 includes of a spring member 88 is coupled with a base 90. The base 90 is secured to tab 92 of the housing 30. A free end 94 of the spring member 88 is disposed so as to contact the portion 75 of the poppet 40. In FIG. 7, the base 90 is secured or captured in a pocket 96 defined in the housing 30 with the free end of the spring member 88 being disposed so as to contact the portion 75 of the poppet 40.

The illustrated embodiment has many advantages including:
1. Friction is used as a damping or dashpot to eliminate poppet resonance.
2. Friction force is created by biasing the poppet 40 against the side of the retaining tube 78 using the spring structure 72.
3. The use of the spring structure 72 is more cost-effective than using a magnet.
4. The spring also provides points of contact against the restraining tube and spring which will assist in minimizing any rolling effect of the poppet within the restraining tube.
5. The restraining tube is formed off center so as to establish the poppet on center with the remainder of the component.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A pressure management apparatus comprising:
a housing defining a fluid communication passage between first and second fluid ports,
a poppet disposed in the housing and being movable between first and second positions, the first position preventing fluid communication between the first and second fluid ports, and the second position permitting fluid communication between the first and second fluid ports, the poppet including a portion translatable along an axis relative to the housing,
a member fixed with respect to the housing and associated with the portion of the poppet, and
spring structure associated with the portion of the poppet, the spring structure being constructed and arranged to engage and bias the portion of the poppet in a direction generally transverse with respect to the axis to frictionally engage a portion of the member to create a dashpot damping of resonance of the poppet in the second position,
wherein the spring structure is a metal structure having a portion secured to one of the housing or the member, with a free end of the metal structure engaging the portion of the poppet.

2. The apparatus of claim 1, wherein the portion of the poppet is a tubular portion, the spring structure engaging an outside surface of the tubular portion.

3. The apparatus of claim 2, wherein the tubular portion is molded from plastic.

4. The apparatus of claim 2, wherein the member is in the form of at least a partial tube, a portion of the outside surface of the tubular portion engaging an inside surface of the partial tube.

5. The apparatus of claim 1, wherein the member is a partial tube having an opening therein, the spring structure including a resilient base frictionally engaging a portion of the periphery of the partial tube, the spring structure including a spring member coupled with the base, a free end of the spring member being disposed in the opening so as to contact the portion of the poppet.

6. The apparatus of claim 4, wherein the partial tube has an axis that is off-set from a vertical axis so as to compensate for skewing of the structure due to the bias of the spring structure.

7. A poppet assembly for a pressure management apparatus for a vehicle, the poppet assembly comprising:
a poppet defining an armature that is constructed and arranged to move between first and second positions along an axis,
a stator member associated with the poppet, and
spring structure associated with the poppet to engage and bias a portion of the poppet in a direction generally transverse with respect to the axis and into frictional contact with the stator member to create a dashpot damping of resonance of the poppet,
wherein the spring structure is a metal structure having a fixed portion, and a free end engaging the portion of the poppet.

8. The assembly of claim 7, wherein the portion of the poppet is a tubular portion, the spring structure engaging an outside surface of the tubular portion.

9. The assembly of claim 8, wherein the stator member is in the form of at least a partial tube, a portion of the outside surface of the tubular portion engaging an inside surface of the partial tube.

10. The assembly of claim 7, wherein the stator member is a partial tube having an opening therein, the spring structure including a resilient base frictionally engaging a portion of the periphery of the partial tube, the spring structure including a spring member coupled with the base, a free end of the spring member being disposed in the opening so as to contact the portion of the poppet.

11. The assembly of claim 9, wherein the partial tube has an axis that is off-set from a vertical axis so as to compensate for skewing of the structure due to the bias of the spring structure.

12. A method of damping resonance of a poppet of a pressure management apparatus for a vehicle, the method comprising:

providing a poppet defining an armature that is constructed and arranged to move between first and second positions along an axis in a housing of the pressure management apparatus, providing a stator member associated with the poppet and fixed with respect to the housing, and biasing at least a portion of the poppet in a direction generally transverse with respect to the axis and into frictional engagement with the stator member thereby damping resonance of the poppet as the poppet moves, wherein the biasing step includes providing a metal spring structure having a fixed portion, and a free end engaging the portion of the poppet.

13. The method of claim 12, wherein step of providing the poppet includes providing a tubular portion, and the step of providing the stator member includes providing at least a partial tube, the biasing step including using spring structure to bias the tubular portion such that an outside surface of the tubular portion engages an inside surface of the partial tube.

14. The method of claim 12, wherein the stator member is a partial tube having an opening therein, the biasing step including providing spring structure having a resilient base frictionally engaging a portion of the periphery of the partial tube, the spring structure including a spring member coupled with the base, a free end of the spring member being disposed in the opening so as to engage the portion of the poppet.

* * * * *